April 16, 1957     R. P. FORRESTAL ET AL     2,789,262
FEED-BACK REGULATING SYSTEMS

United States Patent Office 2,789,262
Patented Apr. 16, 1957

2,789,262
FEED-BACK REGULATING SYSTEMS

Roger P. Forrestal, Whitefish Bay, and Gerald Secor, Menomonee Falls, Wis., assignors to Cutler-Hammer, Inc., Milwaukee, Wis., a corporation of Delaware Application January 19, 1955, Serial No. 482,760

7 Claims. (Cl. 318—146)

This invention relates to feed-back regulating systems. In particular, it relates to improved systems for relating an output quantity through the medium of a plurality of separately energizable electro-responsive regulating elements.

Other applications of the invention are possible, but it is particularly useful in the control of adjustable-voltage drives. Accordingly, while it is a general object of the invention to provide an improved feed-back regulating system of the type described, it is a more specific object to provide an improved adjustable-voltage drive system.

Another object of the invention is to provide an improved feed-back system for regulating the speed of a motor whose armature is connected to the armature of a generator by varying the field excitation of the motor and generator through the medium of a single speed setting element while providing feed-back control at all motor speeds.

Another object is to provide an improved adjustable-voltage drive which combines the feature of accuracy of speed regulation with simplicity and low cost.

Various other objects and advantages of the invention will hereinafter appear.

In realizing certain of these objects, two (or two sets of) electro-responsive elements are arranged so that each affects the quantity to be regulated in an opposite sense. One element exercises primary control over the value of the regulated quantity for values differing in one sense from a base value. The other element exercises primary control when the value of the regulated quantity differs from the base value in the opposite sense. Electrical signals proportional to the desired and actual values of the regulated quantity are compared and a third signal which represents their difference is compared with a fourth signal representing the base value of the regulated quantity. Another signal which is proportional to the difference between the third and fourth signals is applied to one electro-responsive element or the other in accordance with whichever of the third or fourth signals is greater.

Certain embodiments of the invention are illustrated in the accompanying drawing, it being understood that certain modifications are possible to be made in the embodiments illustrated, and that other embodiments are possible without departing from the spirit of the invention or the scope of the appended claims.

In the drawings, Fig. 1 illustrates diagrammatically an adjustable-voltage drive embodying the invention;

Figure 1:
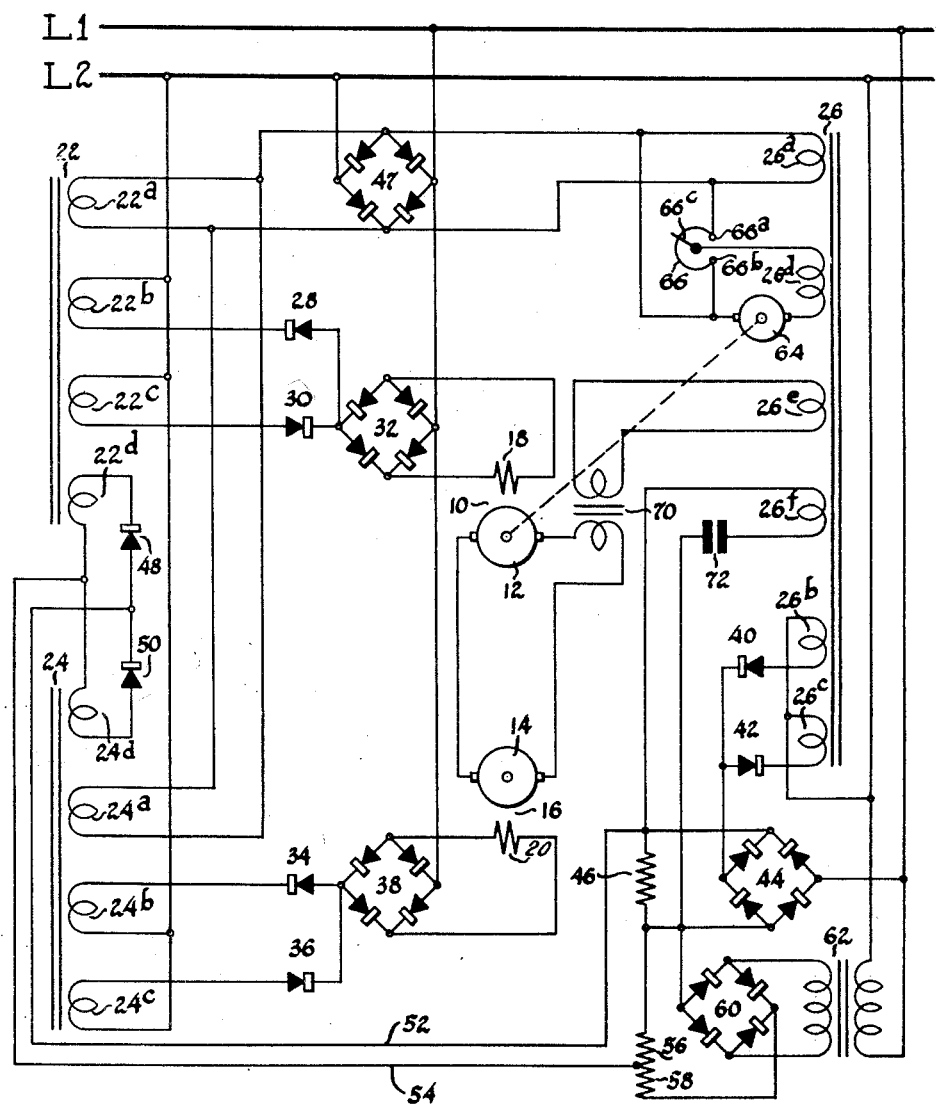

Referring to Fig. 1, there is shown a motor 10 the speed of which is to be regulated. The armature 12 of the motor 10 is connected in loop circuit with the armature 14 of a generator 16. The motor and generator have field windings 18 and 20, respectively. At some base value of motor speed (which may or may not be rated, full-load speed), both of these field windings are fully energized. To increase the motor speed above base value, the excitation of motor field 18 is diminished by a motor field control magnetic amplifier 22. To decrease motor speed below base speed, the motor armature terminal voltage is reduced by reducing excitation of field 20 of generator 16. The degree of excitation of field 20 is controlled by generator field control magnetic amplifier 24. A third magnetic amplifier 26 amplifies and controls feed-back.

Power for the system is supplied from any suitable source such as alternating power lines L1 and L2.

Amplifiers 22 and 24 have bias windings $22^a$ and $24^a$, power windings $22^b$, $22^c$, and $24^b$ and $24^c$ and control windings $22^d$ and $24^d$, respectively. Amplifier 26 has a bias winding $26^a$, power windings $26^b$ and $26^c$, a control winding $26^d$ and anti-hunt windings $26^e$ and $26^f$.

Both power windings of each amplifier are connected in series with a half-wave rectifier unit. In each amplifier these series circuits are connected in parallel with their rectifiers oppositely polarized. In each case the parallel circuit is connected across supply lines L1 and L2 in series with the alternating power input terminals of a respectively associated full-wave rectifier. Alternating current from lines L1 and L2 flows alternating in one power winding and then the other during opposite half-cycles of the supply wave in an amount determined by the reactance of the power windings. This reactance is determined by the degree of saturation of the amplifier core. The magnitude of the unidirectional voltage available at the output terminals of the full-wave rectifier varies with core saturation and increases as saturation increases.

Power windings $22^b$ and $22^c$ and their respective series half-wave rectifiers 28 and 30 are connected in parallel. This parallel combination is connected in series with the input terminals of bridge rectifier 32 across lines L1 and L2. The unidirectional output terminals of rectifier 32 are connected to field winding 18. Power windings $24^b$ and $24^c$ and their respective series half-wave rectifiers 34 and 36 are connected in parallel. This parallel combination is connected in series with the input terminals of a bridge rectifier 38, across lines L1 and L2. The unidirectional output terminals of rectifier 38 are connected to field winding 20. Power windings $26^b$ and $26^c$ and their respective series half-wave rectifiers 40 and 42 are connected in parallel. This parallel combination is connected in series with the input terminals of a bridge rectifier 44 across lines L1 and L2. The unidirectional output terminals of rectifier 44 are connected across a resistor 46.

Bias windings $22^a$, $24^a$ and $26^a$ of amplifiers 22, 24 and 26, respectively, are connected in parallel and are energized with unidirectional power which is derived from lines L1 and L2 and is rectified in a full-wave rectifier 47.

Bias windings $22^a$ and $24^a$ are energized the least amount necessary to saturate the cores of their respective amplifiers and so that field windings 18 and 20 are fully excited when control windings $22^d$ and $24^d$ are not energized. Upon energization of either of these control windings, the effect of its associated bias winding is diminished and the excitation of its corresponding field winding is diminished.

Each of the control windings $22^d$ and $24^d$ is connected in series with one of half-wave rectifiers 48 and 50. These series circuits are connected in parallel so that rectifiers 48 and 50 are arranged in opposite direction of polarity. The parallel circuit is connected by conductors 52 and 54 across the series circuit combination of resistor 46 and resistor 56. Resistor 56 is connected in series with another resistor 58 across the unidirectional voltage output terminals of a full-wave rectifier 60. The rectifier 60 is powered from lines L1 and L2 through a transformer 62.

The voltage across resistor 56 is fixed at a convenient value which represents base speed of motor 10. The voltage across resistor 46 opposes that across resistor 56 so that when these voltages are equal, no voltage is applied to the parallel combination of control windings 22$^d$ and 24$^d$. If the voltage across resistor 46 is less than the voltage across resistor 56, conductor 54 will be positive with respect to conductor 52. Current flow in control winding 22$^d$ is prevented by rectifier 48 but rectifier 50, being opposite polarized, permits current flow in control winding 24$^d$. Conversely, if the voltage across resistor 46 is greater than the voltage across resistor 56, conductor 54 will be negative with respect to conductor 52 and current will not flow in winding 24$^d$ but will flow in winding 22$^d$. The magnitude of current flow in winding 22$^d$ or 24$^d$ is determined by the magnitude of the difference between the voltages across resistors 46 and 56.

The value of the voltage drop across resistor 46 is determined by the magnitude of current flow through power windings 26$^b$ and 26$^c$ of feed-back amplifier 26. The magnitude of this current flow is determined by the degree of saturation of the core of amplifier 26; and the degree of saturation is determined by the energization of bias winding 26$^a$ and control winding 26$^d$.

The bias winding 26$^a$ is energized enough to overcome saturation of the core of amplifier 26 when control winding 26$^d$ is not energized. Then, power windings 26$^b$ and 26$^c$ conduct minimum current and minimum voltage appears across resistor 46. Accordingly, control winding 22$^d$ is not energized, the core of amplifier 22 is fully saturated by bias winding 22$^a$ and motor field winding 18 is fully energized. Control winding 24$^d$ is fully energized so that the effect of bias winding 24$^a$ is overcome. The core of amplifier 24 is not saturated and generator field winding 20 is energized a minimum amount. Accordingly, the generator output voltage is small. Motor 10, having maximum field excitation and minimum armature excitation, operates at minimum speed.

A tachometer 64 is coupled to motor 10 and generates a voltage proportional to the speed of the motor 10. A speed setting potentiometer 66 is connected by its end terminals 66$^a$ and 66$^b$ to the unidirectional voltage output terminals of full-wave rectifier 47. That portion of potentiometer 66 which extends from its tap 66$^c$ to terminal 66$^b$ is connected in loop circuit with tachometer 64 and field control winding 26$^d$. The voltage across this portion of the potentiometer opposes the tachometer voltage. When the tap 66$^c$ is set for minimum motor speed and the motor is operating at that speed, these voltages cancel. No voltage is applied to winding 26$^d$ and minimum voltage appears across resistor 46 as hereinbefore described.

As the tap 66$^c$ is moved clockwise to higher speed settings, the energization of control winding 26$^d$ is increased, the saturation of the core of amplifier 26 is increased and the voltage across resistor 46 is increased toward a value equal to the voltage drop across resistor 56. The energization of winding 24$^d$ is decreased and the excitation of generator field winding 20 is increased. This results in an increase in motor 10 speed and tachometer 64 speed. The tachometer voltage increases but does not attain a value equal to the potentiometer voltage. Instead it increases to a value which results in energization of winding 26$^d$ in the amount required to maintain the speed of motor 10 at a value corresponding to the setting of tap 66$^c$.

When this tap is set at base motor speed and the motor is running at base speed, the difference between the potentiometer and tachometer voltages is just sufficient to energize winding 26$^d$ in the amount required to cause a voltage drop across resistor 46 which is equal to that across resistor 56. Neither winding 22$^d$ nor winding 24$^d$ is energized and field windings 18 and 20 are fully excited.

When tap 66$^c$ is set at a point corresponding to a motor speed above base value and the motor is operating at that speed, the difference between the potentiometer and tachometer voltages is increased. The voltage across resistor 46 is exceeded by the voltage across resistor 56. Control winding 22$^d$ is energized and control winding 24$^d$ is not. Thus, the motor field is weakened but the generator field is fully energized.

For each speed setting of potentiometer tap 66$^c$ there is a corresponding tachometer voltage which provides the voltage difference which must be applied to control winding 26$^d$ for operation of the motor at that speed. When motor speed exceeds that value, the tachometer voltage will be excessive. In this event the voltage of resistor 46 will be low. Conversely, if motor speed is too low the voltage of resistor 46 will be greater than normal for the desired motor speed. At motor speeds below base speed a corrective signal will be applied to generator field 20. At motor speeds above base speed the corrective signal is applied to motor field 18.

The system illustrated in Fig. 1 also has two minor feed-back loops which prevent hunting. Winding 26$^e$ is connected to the secondary winding of a transformer 70 whose primary is connected in series in the motor and generator armature loop circuit. A voltage proportional to the rate of change of loop current is applied to winding 26$^e$ and acts to oppose the current change. Winding 26$^f$ is connected through a capacitor 72 across resistor 46 so that a voltage substantially proportional to the rate of change of the voltage across this resistor is applied to winding 26$^f$ in a direction to oppose the change in said voltage.

It is desirable to filter the output of the bridge rectifiers 44, 47 and 60 but for the sake of clarity the smoothing filters have been omitted.

Figure 2:
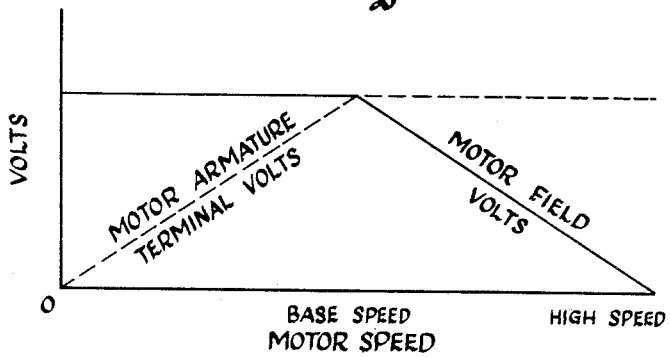
Fig. 2 is a graph illustrating the operation of the drive of Fig. 1.

The relationship of the voltages applied to motor armature 12 and motor field 18 and motor speed are illustrated in Fig. 2. The field voltage is constant at speeds between zero and base speed and is reduced at higher motor speeds. The motor armature voltage increases from zero at zero speed to a maximum at base speed. At higher speeds the armature voltage remains at maximum value.

Figure 3:
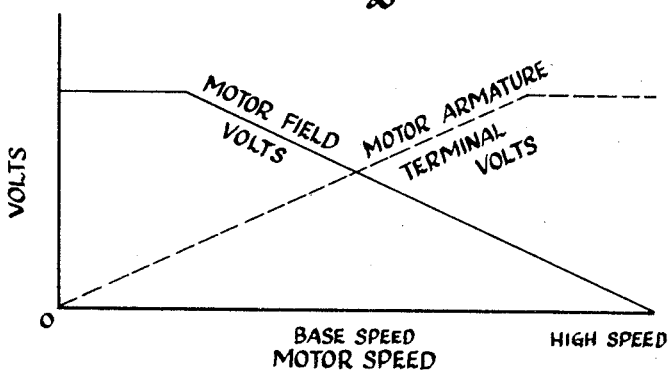
Fig. 3 is a graph illustrating operation of a modified drive.

In certain applications of adjustable-voltage drives it is desirable to control motor speed over a portion or all of the speed range by adjusting both the field voltage and armature terminal voltage. Example motor armature and field relationships in this type of operation are illustrated in Fig. 3. This mode of operation can be accomplished by providing separate reference voltages for comparison with the voltage drop across resistor 56.

Figure 4:
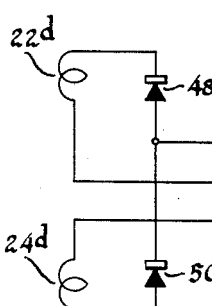
Fig. 4 illustrates diagrammatically a modification of the drive shown in Fig. 1.
Figure 4:
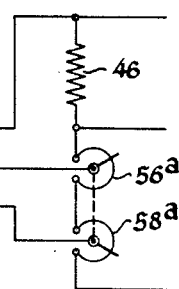

Fig. 4 illustrates one way that Fig. 1 may be modified to provide the operating characteristics illustrated in Fig. 3. Conductor 54 in Fig. 1 is replaced in Fig. 4 by two conductors 54$^a$ and 54$^b$ which are individualized to control windings 22$^d$ and 24$^d$, respectively. Conductor 54$^a$ is connected to the tap of a potentiometer 56$^a$ which replaces resistor 56 of Fig. 1, and conductor 54$^b$ is connected to the tap of another potentiometer 58$^a$ which replaces resistor 58 of Fig. 1.

When the taps of potentiometers 56$^a$ and 58$^a$ are turned full clockwise and counter-clockwise, respectively, said taps will be at the same potential and the operation of the system will be that operation illustrated in Fig. 2. However, when the taps of these potentiometers are positioned as shown in Fig. 4, the system operates as illustrated in Fig. 3. The voltage drop across potentiometer 56$^a$, from its junction with resistor 46 to its tap, is less than that voltage drop across resistor 46 which corresponds to base motor speed. Accordingly, this potentiometer voltage is exceeded by the voltage of resistor 46 at lower speeds and control winding 22$^d$ is energized and effects reduction in motor field excitation at motor speeds above a speed value which is below base speed.

The voltage across resistor 46 must have a value exceeding the value corresponding to base motor speed in order to match the higher voltage drop between the tap of potentiometer 58ᵃ and (the negative line at the junction of potentiometer 58ᵃ) and resistor 46. Accordingly, control winding 24ᵈ is energized and the energization of field 20 of generator 16 is adjusted in a range of motor speeds extending from zero to a speed above base speed.

We claim:

1. In a control system for an adjustable-voltage drive comprising a motor and a generator each having a field winding and having their armatures connected in loop circuit, means providing a voltage varying in magnitude in accordance with the difference between the actual and the desired speeds of said motor, means providing a reference voltage representing a predetermined base speed of said motor, means subjected to said voltages to apply a voltage which is a function of the difference therebetween to the field of said generator or to the field of said motor in accordance with the comparative amplitude of the voltage representing the difference between actual and desired speeds of the motor as against the voltage representing base speed of the motor.

2. In a control system for an adjustable-voltage drive comprising a motor and a generator each having a field winding and having their armatures connected in loop circuit, means providing a voltage varying in magnitude in accordance with the difference between the actual and the desired speeds of said motor, means to detect whether said latter voltage is greater than or less than a selected magnitude, and means to apply a voltage inversely proportional to said latter voltage either to the field of said generator or to the field of said motor in accordance with the relative magnitude of said selected magnitude and the actual magnitude of said latter voltage.

3. In a control system for an adjustable-voltage drive comprising an electric motor and a generator having their armatures connected in a loop circuit and each having an exciting field winding, means to provide a reference signal corresponding to a pre-selected base motor speed, means to provide a signal varying in accordance with the difference between actual and desired speeds of said motor, means to compare said signals and provide a signal proportional to the difference therebetween and of a sense indicative of which of said signals is larger, means to effect energization of said motor and said generator windings at pre-determined levels and to reduce energization of said field windings one at a time in accordance with the indication of which of said signals was larger and in an amount proportional to the difference between said signals.

4. In a control system for an adjustable-voltage drive comprising an electric motor and a generator having their armatures connected in a loop circuit and each having an exciting field winding, field control magnetic amplifiers individualized to said field windings and each having a control winding to control the energization of its associated field winding, means providing a source of voltage representing a predetermined base speed of the motor, means providing a source of voltage proportional to the difference between actual and desired speeds of the motor, a third amplifier having an output winding and an input winding the latter being connected to said source of voltage proportional to the difference between actual and desired speeds of the motor, means to compare the output voltage of said third amplifier with said voltage representing base motor speed and to energize the control windings of said field control magnetic amplifiers one at a time in accordance with whether the output voltage of said third amplifier or said voltage representing base motor speed is larger and in a degree proportional to the difference in said last mentioned voltages.

5. The combination defined in claim 4 including bias means associated with and individualized to said field control magnetic amplifiers and normally acting to energize said exciting field windings of said motor and said generator for operation of the motor at base speed.

6. The combination defined in claim 5 in which said third amplifier is provided with an anti-hunt control winding connected to be responsive to the rate of change of said voltage proportional to the difference between actual and desired speeds of the motor and acting to oppose said change.

7. In a control system for an adjustable-voltage drive comprising a motor and a generator each having a field winding and having their armatures connected in loop circuit, means providing a voltage the magnitude of which is a function of the difference between the desired and actual speeds of said motor, means providing a source of a first reference voltage representing one speed of said motor and means providing a source of a second reference voltage representing a higher speed of said motor, means to compare the first mentioned voltage with each of said reference voltages and comprising means to alter the excitation of the field of said motor in proportion to the amount by which said first mentioned voltage differs in one sense from said first reference voltage and means to alter the excitation of the field of said generator in proportion to the amount by which said voltage first mentioned differs in an opposite sense from said second reference voltage.

References Cited in the file of this patent

UNITED STATES PATENTS 2,641,735   Elliot _____ June 9, 1953